United States Patent
Glingener et al.

(10) Patent No.: US 7,312,909 B2
(45) Date of Patent: Dec. 25, 2007

(54) METHOD FOR SYNCHRONIZING THE PHASE OF OPTICAL RETURN-TO-ZERO (RZ) DATA SIGNALS

(75) Inventors: Christoph Glingener, Feldkirchen-Westerham (DE); Erich Gottwald, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 910 days.

(21) Appl. No.: 10/168,924

(22) PCT Filed: Dec. 19, 2000

(86) PCT No.: PCT/DE00/04545

§ 371 (c)(1),
(2), (4) Date: Jun. 25, 2002

(87) PCT Pub. No.: WO01/50664

PCT Pub. Date: Jul. 12, 2001

(65) Prior Publication Data

US 2002/0191255 A1   Dec. 19, 2002

(30) Foreign Application Priority Data

Dec. 30, 1999 (DE) ............................... 199 63 802

(51) Int. Cl.
G02B 26/08 (2006.01)
H04B 10/08 (2006.01)
H04J 14/00 (2006.01)
H04J 4/00 (2006.01)
H04J 14/08 (2006.01)

(52) U.S. Cl. .................... 359/158; 398/25; 398/33; 398/47; 398/75; 398/98; 398/192; 398/193

(58) Field of Classification Search ................ 398/102, 398/25, 33, 47, 75, 98, 192, 193; 359/158
See application file for complete search history.

(56) References Cited

U.S. PATENT DOCUMENTS

| | | | | |
|---|---|---|---|---|
| 5,050,167 A * | 9/1991 | Izadpanah | .................... | 370/535 |
| 5,786,918 A * | 7/1998 | Suzuki et al. | .................. | 398/98 |
| 5,917,528 A * | 6/1999 | Grellmann et al. | ........... | 347/88 |
| 5,926,297 A * | 7/1999 | Ishikawa et al. | .............. | 398/43 |
| 6,137,610 A * | 10/2000 | Patrick | ....................... | 398/154 |
| 6,236,488 B1 * | 5/2001 | Shimizu et al. | ............. | 398/198 |
| 6,424,443 B1 * | 7/2002 | Brindel et al. | .............. | 398/154 |
| 6,459,518 B1 * | 10/2002 | Suzuki et al. | ................ | 398/152 |

FOREIGN PATENT DOCUMENTS

| | | |
|---|---|---|
| DE | 41 30 048 | 3/1993 |
| EP | 0 936 773 | 8/1999 |
| EP | 1 059 758 | 12/2000 |

* cited by examiner

Primary Examiner—Kenneth Vanderpuye
Assistant Examiner—Ken Malkowski
(74) Attorney, Agent, or Firm—Bell, Boyd & Lloyd LLP

(57) ABSTRACT

In order to synchronize the phases of two RZ data signals (RZS1, RZS2) combined to form a time multiplex signal (MS1), the power of half the fundamental made of the multiplex signal (MS1) is measured and the phase difference is controlled such that its power assumes a minimum.

11 Claims, 4 Drawing Sheets

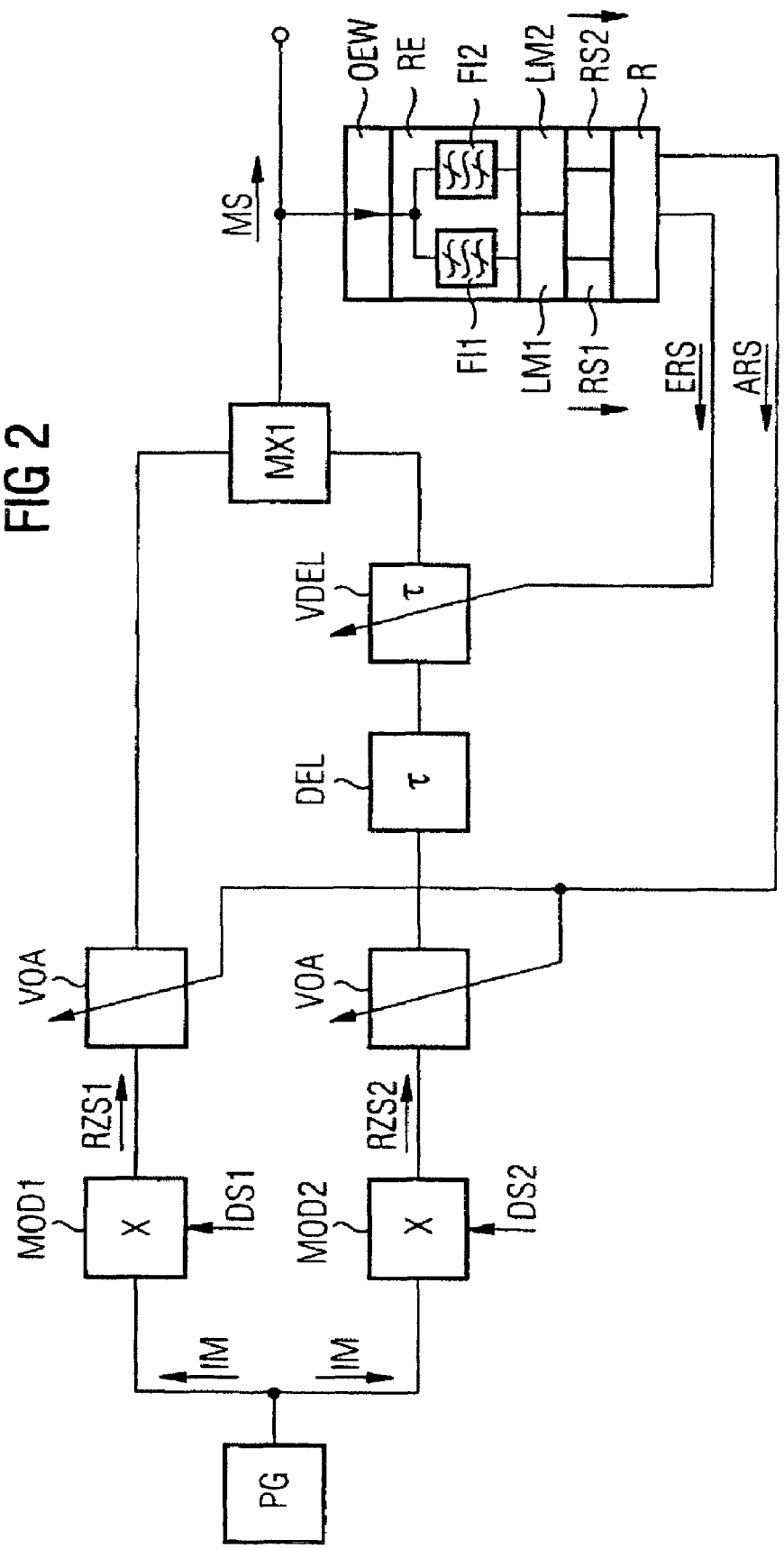

METHOD FOR SYNCHRONIZING THE PHASE OF OPTICAL RETURN-TO-ZERO (RZ) DATA SIGNALS

The invention relates to a method for synchronizing the phase of synchronous optical RZ data signals.

By contrast with NRZ (not return to zero) pulses, the use of RZ (return to zero) pulses in optical long-distance systems renders it possible to increase the bit rate or substantially increase (approximately double) the regenerator-free range.

RZ transmitting devices are frequency implemented by switching through or blocking the light of a pulse source by means of an electrooptic modulator. Since the pulse width is slight by comparison with the duration of an unmodulated bit, a plurality of data signals can be combined to form a time multiplex signal. In the case of very high data rates and a plurality of RZ data signals, it is necessary continuously to equalize transit time differences and transit time fluctuations that are caused, for example, by temperature changes.

U.S. Pat. No. 5,786,918 discloses a system for the optical transmission of two data signals by multiplexing return-to-zero pulse trains. The phase difference is achieved by means of an optical time-delay element. It is not possible to equalize fluctuating transit times between the pulse trains.

DE 41 30 048 A1 discloses optical multiplexers and demultiplexers for combining and separating two optical signals with high data rates.

Arrangements for multiplexing and demultiplexing optical signals are described in patent U.S. Pat. No. 5,050,167. At the transmitting end, the signals are subjected to different time delays by means of fixed time-delay elements and combine to form a time multiplex signal. At the receiving end, the time multiplex signal controls a phase locked loop and its signal is fed to a demultiplexer that outputs the individual data signals at its outputs. However, multiplexing with the aid of fixed time-delay elements is problematical in the case of extremely high data rates.

It is the object of the invention to specify a simple method for synchronizing the phases of different RZ data signals.

This object is achieved by means of a method in accordance with patent claim 1.

Advantageous developments of the invention are given in the subclaims.

The simple way of obtaining a reliable control criterion, and the simple implementability of the method are particularly advantageous. The use of one criterion is already sufficient for reliable control. The control accuracy can be increased by using a further control criterion.

The method according to the invention can be applied for 2, 4, 8 etc. RZ data signals. Other spectral frequencies than control signals can be obtained for channel numbers that do not constitute a power of two.

The invention is explained in more detail with the aid of two exemplary embodiments.

In the drawing:

FIG. 2 shows the application of the method for two time multiplex signals,

Figure 1:
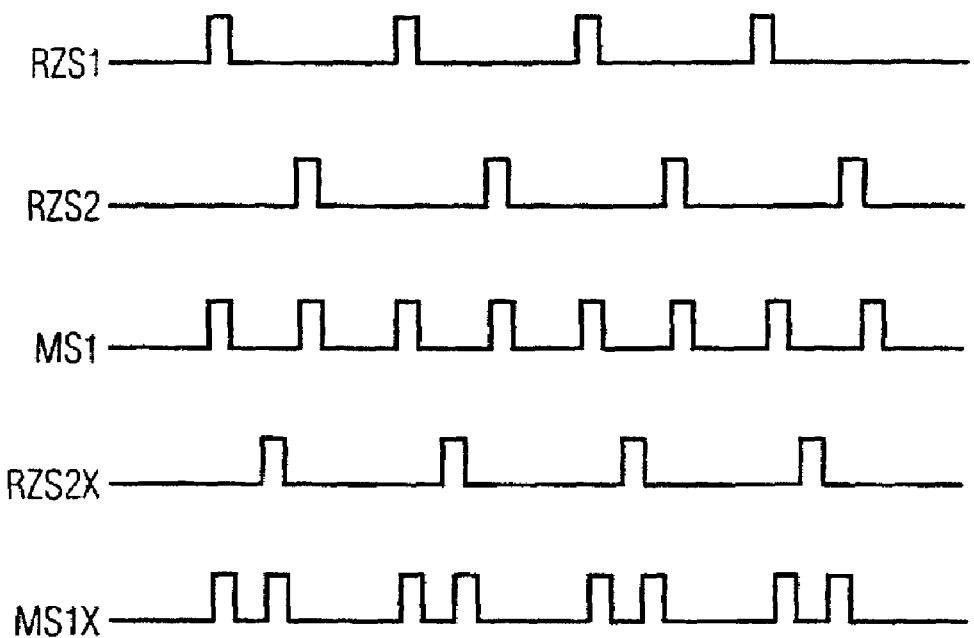
FIG. 1 shows two time multiplex signals without and with a phase displacement.

The timing diagram in FIG. 1 shows a first RZ data signal RZS1 and a second RZ data signal RZS2 whose, for example, pulses representing logic ones are displaced by exactly 180° with reference to the pulses of the first RZ data signal RZS1. For the sake of simplicity, it is assumed here that the information consists only of logic ones; corresponding considerations hold for any desired data frequencies.

The two optimally synchronized RZ data signals RZS1 and RZS2 are combined to form a multiplex signal MS1 with double the pulse or data rate and whose pulse intervals are exactly the same.

If, however, the phase shift of the second RZ data signal DZS2x deviates from the ideal position, the result, for example, is the pulse train MS1x of the multiplex signal. The spectral components of the two pulse trains MS1 and MS1x differ from one another considerably and are therefore used as control signals.

FIG. 2 shows the principle of an arrangement for phase control. A pulse generator PG generates an optical pulse train IM that is fed to a first modulator MOD1 and a second modulator MOD2. There, the pulses of data signals DS1 and DS2 are modulated—here switched through or suppressed, in order to generate the optical RZ data signals RZS1 and RZS2. The first RZ data signal RZS1 is fed via a first attenuator VOA1 to an optical multiplexer MX1, while the second RZ data signal RZS2 is fed to the multiplexer MX1 via an attenuator VOA2, a fixed time-delay element DEL and a variable time-delay element VDEL. It is possible, if appropriate, to dispense with the time-delay element VDEL depending on the adjusting range of the adjustable time-delay element.

Adjustable time-delay elements can be implemented as integrated optical components or as free beam optical systems.

The multiplex signal MS formed from the two RZ data signals is combined where appropriate with further multiplex signals and transmitted. Moreover, the multiplex signal is fed to a control device RE (for example via a coupler). There, it is converted into an electric signal by an optoelectric transducer OEW and fed to a first filter FI1 that is tuned to the data rate of an RZ data signal RZS1, RZS2. It can additionally be fed to a second filter FI2 that is tuned to the data rate of the multiplex signal MS.

After the filtering, the power of the output signals is measured in power meters LM1, LM2, in order to obtain corresponding control signals RS1 and RS2. These are fed to a controller R that generates an adjusting signal ERS that adjusts the time-delay element VDEL2 optimally such that the pulse trains of the two data signals are phase-shifted by 180° relative to one another.

Figure 3:
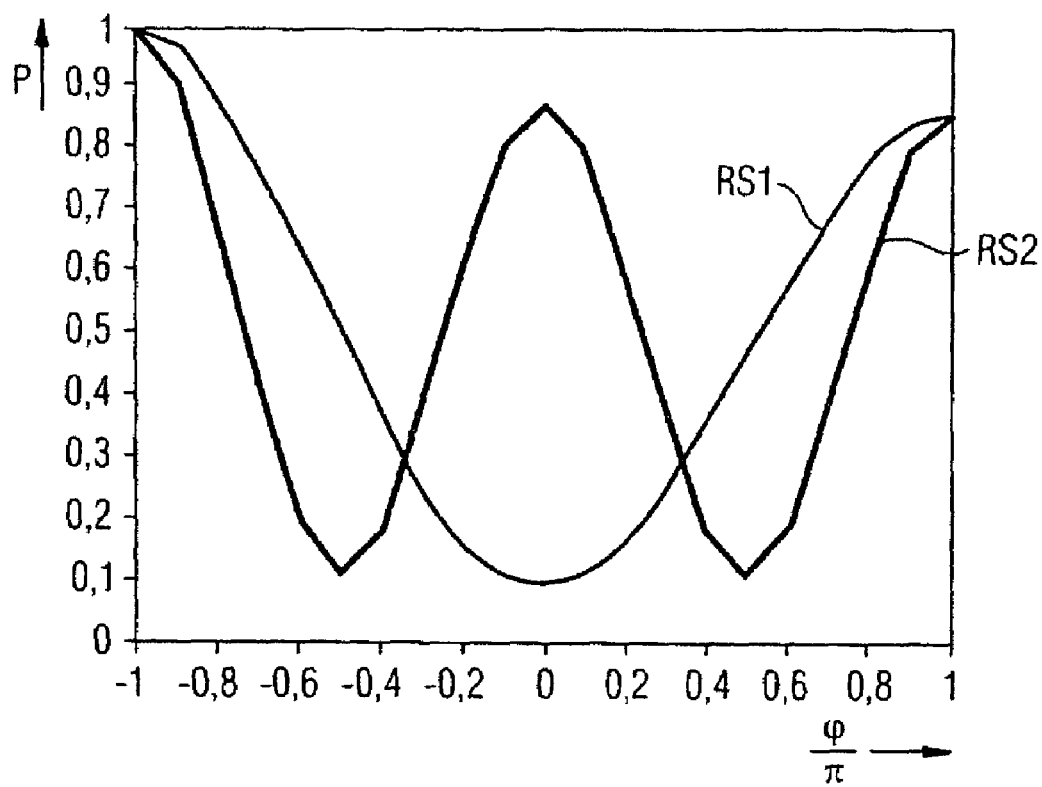
FIG. 3 shows the control signals obtained.

The principal values of the control signals RS1 and RS2 are illustrated in FIG. 3 as a function of the phase difference $\phi/\pi$ between two RZ data signals. Similar profiles are repeated periodically. It suffices that the adjustable time-delay element adjusts the phase difference such that the first control signal RS1 reaches its minimum. In addition, the second control signal RS2 can then be adjusted to a maximum. It is also possible to superimpose the two control signals, one control signal having a reversed sign, and the amplitude of the second control signal RS2 being reduced so far that there is no local minimum.

The control method can consist in that an attempt is made to use a digital control to adjust the optical time-delay element VDEL by changing the adjusting signal ERS, and the change in the control signal RS1 is evaluated, whereupon further adjustments are performed until the power minimum of the control signal RS1 is reached. Another method can consist in varying the phase continuously by sweeping the adjusting signal, and obtaining the adjusting signal ERS by correlating the control signal RS1 with the sweep signal using the lock-in principle.

If the amplitudes of the two RZ data signals RZS1 and RZS2 are not equal, this likewise results in deviations from the minimum of the control signal RS1 and the maximum of the control signal RS2. The method can therefore also be used in a corresponding way to adjust the amplitudes. This is performed in FIG. 2 with the aid of an amplitude control signal ARS which is based on the same criteria RS1 and RS2. In the case of more than two data signals, however, a fixed reference value should be used for all the RZ data signals.

Figure 4:
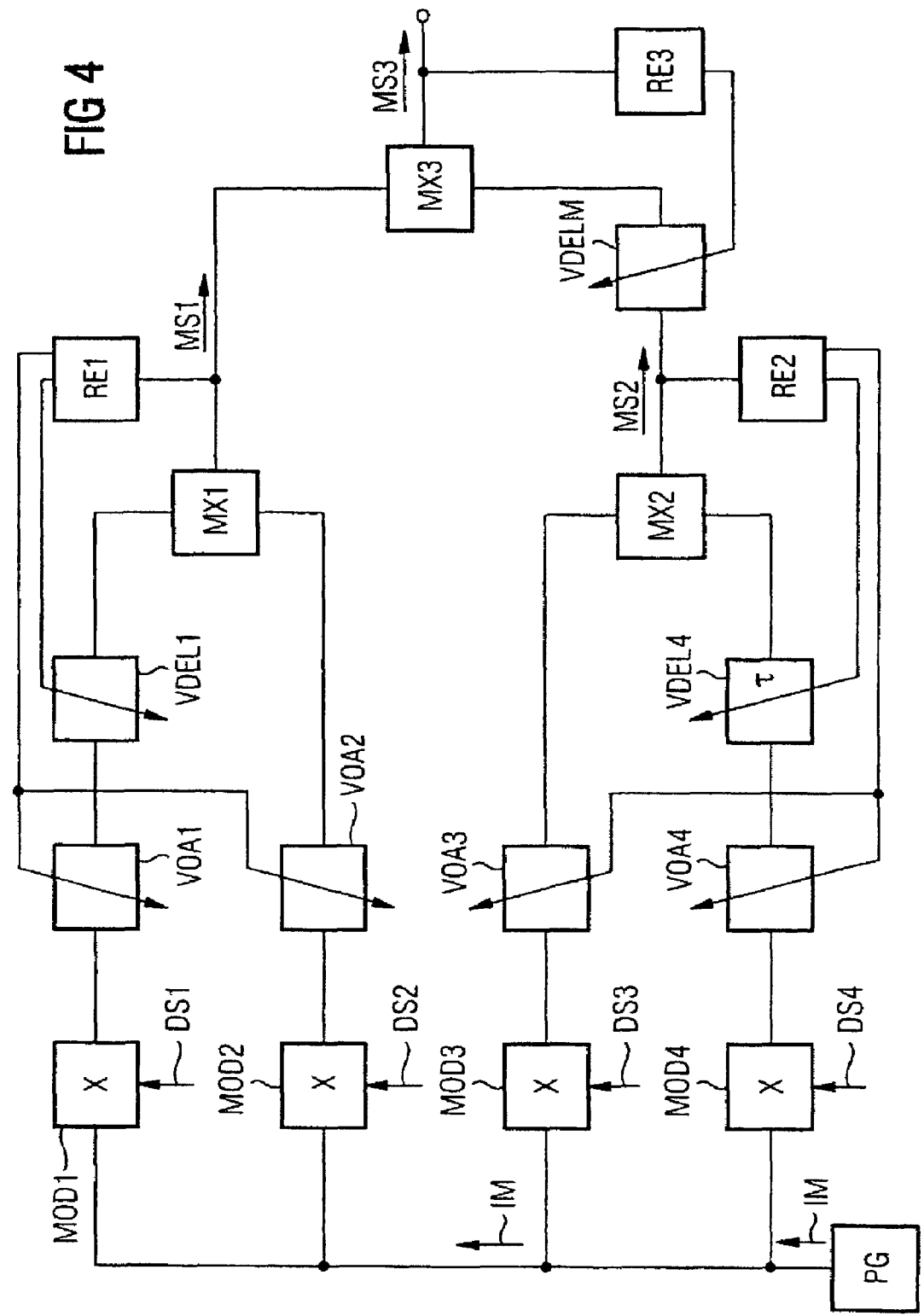
FIG. 4 shows an arrangement for synchronizing the phases of four time multiplex signals.

An arrangement for generating a multiplex signal MS3, containing four data signals DS1 to DS4, in with the appropriate modulators MOD1-MOD4 and adjusting elements VOA1-VOA4, VDEL1, VDEL4, VDELM is illustrated in FIG. 4 in a simplified form.

In each case two RZ data signals RZS1 and RZS2 or RZS3 and RZS4 are combined to form a multiplex signal MS1 or MS2. The control devices RE1 and RE2 in each case combine the two RZ data signals to form time multiplex signals MS1 and MS2. The latter are combined via a further multiplexer MX3 to form a multiplex signal MS3 of higher order, a further control device RE3 ensuring via the time-delay element VDELM that there is an ideal phase angle between the two multiplex signals MS1 and MS2.

Figure 5:
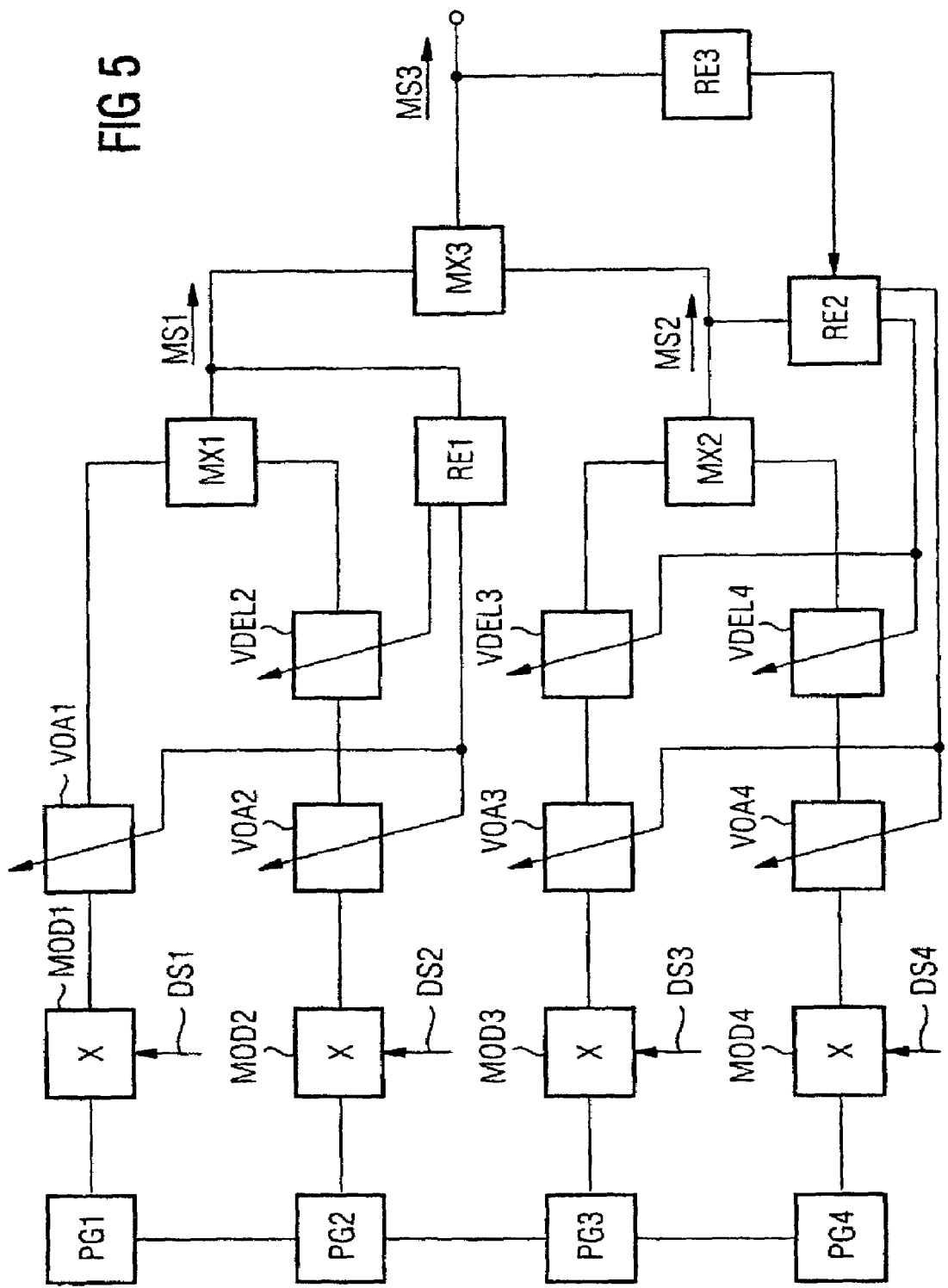
FIG. 5 shows a variant of this arrangement.

FIG. 5 illustrates a variant in which a controllable time-delay element VDEL2 to VDEL4 is inserted in each data branch except for the first, and via the second control device RE2 the third control device RE3 also influences the time-delay elements VDEL3 and VDEL4 such that all the RZ data signals are merged, in turn, with exact phase angles. A plurality of synchronized pulse generators apply the pulse trains here.

It remains to add that the control criteria can likewise be used to adjust electric time-delay elements or to synchronize pulse generators that permit phase control in a corresponding way.

The invention claimed is:

1. A method for synchronizing a phase of synchronous optical RZ data signals, the method comprising the steps of:
   combining, in each case, two of the RZ data signals to form a time-multiplex signal in conjunction with same pulse intervals;
   measuring a spectral power of the time-multiplex signal at a frequency corresponding to a data rate of one of the two RZ data signals; and
   controlling a phase shift between the two RZ data signals such that the measured power reaches a minimum.

2. A method for synchronizing a phase of synchronous optical RZ data signals as claimed in claim 1, the method further comprising the steps of:
   measuring the spectral power at a frequency corresponding to a data rate of the time-multiplex signal; and
   controlling the phase shift between the two RZ data signals such that the power reaches a local maximum at the measured frequency.

3. A method for synchronizing a phase of synchronous optical RZ data signals as claimed in claim 1, the method further comprising the steps of:
   guiding at least one of the two optical RZ data signals via an adjustable time-delay element in connection with the step of combining;
   converting the time-multiplex signal into an electric signal;
   feeding the electric signal to a first filter, whose transmission frequency corresponds to the data rate of one of the two RZ data signals;
   obtaining a first control signal by measuring the power; and
   controlling a phase shift between the two RZ data signals by adjusting the time-delay element, such that the power of the first control signal reaches a minimum.

4. A method for synchronizing a phase of synchronous optical RZ data signals as claimed in claim 3 the method further comprising the steps of:
   feeding the time-multiplex signal to a second filter whose transmission frequency corresponds to the data rate of the time-multiplex signal;
   obtaining a second control signal by power measurement; and
   controlling the phase shift between the two RZ data signals such that a power of the second control signal reaches a local maximum at an at least approximate minimum of the first control signal.

5. A method for synchronizing a phase of synchronous optical RZ data signals as claimed in claim 4, the method further comprising the step of forming a single control signal by overlapping the first and second control signals.

6. A method for synchronizing a phase of synchronous optical RZ data signals as claimed in claim 1, the method further comprising the steps of:
   combining two of the RZ data signals to form a time-multiplex signal;
   combining two time-multiplex signals to form a multiplex signal of higher order; and
   providing a control device for, in each case, one of the two RZ data signals and two of the time-multiplex signals.

7. A method for synchronizing a phase of synchronous optical RZ data signals as claimed in claim 1, the method further comprising the step of controlling amplitudes of the two RZ data signals such that the power reaches a minimum at a frequency corresponding to a data rate of one RZ data signal and, where appropriate, additionally controlling the amplitudes such that the power reaches a local maximum at a frequency corresponding to a data rate of the time-multiplex signal.

8. A method for synchronizing a phase of synchronous optical RZ data signals as claimed in claim 1, wherein the control is performed using a lock-in principle with the aid of sweep signals.

9. A method for synchronizing a phase of synchronous optical RZ data signals as claimed in claim 7, the method further comprising the step of alternately adjusting one of a phase angle and the amplitudes.

10. A method for synchronizing a phase of synchronous optical RZ data signals as claimed in claim 7, wherein an optimization is carried out via different lock-in control loops.

11. A method for synchronizing a phase of synchronous optical RZ data signals as claimed in claim 1, further comprising the step of varying carrier frequencies of the RZ data signals in order to avoid disturbing interference.

* * * * *